United States Patent [19]
Bechtold et al.

[11] 3,992,658
[45] Nov. 16, 1976

[54] METHOD FOR CHARGING STORAGE CELLS OR STORAGE BATTERIES

[75] Inventors: Leander Bechtold, Umkirch; Günther Kartscher, Buchheim, both of Germany

[73] Assignee: Pro Casa-Gesellschaft, REG. TRUST, Vaduz, Liechtenstein

[22] Filed: June 24, 1975

[21] Appl. No.: 589,753

[30] Foreign Application Priority Data
June 26, 1974 Germany............................ 2430684
Jan. 28, 1975 Germany............................ 2503331

[52] U.S. Cl.................................. 320/20; 320/39; 320/40
[51] Int. Cl.² ......................................... H02J 7/04
[58] Field of Search............... 320/21, 39, 40, 22–24, 320/46, 20

[56] References Cited
UNITED STATES PATENTS
3,794,905  2/1974  Long................................. 320/39 X
3,800,208  3/1974  Macharg............................. 320/20

Primary Examiner—Robert J. Hickey
Attorney, Agent, or Firm—Martin A. Farber

[57] ABSTRACT

A method for charging storage cells or storage batteries by automatically switching a charger off or over to trickle charge when full charge is reached, comprising the steps of automatically determining the shape of the charging voltage curve as a function of time after the gassing voltage of the storage cell or storage battery to be charged has been reached, and switching the charging current off or over to trickle charge as soon as the increase of the charging voltage approaches zero in the course of time.

The method further includes the steps of providing an auxiliary voltage by charging a capacitor with a charge current, automatically varying the charge current within pre-set limits and automatically simulating the shape of the charging voltage curve of the storage device as a function of time by means of the auxiliary voltage, after reaching the gassing voltage, such that the auxiliary voltage is a certain extent smaller than the charging voltage as long a difference quotient of the charging voltage exceeds the difference quotient of the capacitor voltage defined by a predetermined lower limit of the charge current of the capacitor after the same time. The charger is automatically cut off if the charging voltage equals or is lower than the capacitor voltage.

2 Claims, 4 Drawing Figures

METHOD FOR CHARGING STORAGE CELLS OR STORAGE BATTERIES

The invention relates to a method for charging storage cells or storage batteries where the charger is automatically switched off or over to trickle charge, when full charge is reached.

Such methods shall on the one hand make the charging of storage cells and storage batteries possible within the shortest period of time, thereby eliminating the possibility of damage to the battery; on the other hand they shall help to achieve that the charger is not switched over or off too early or too late, when full charge is reached.

It is a generally known procedure to charge by means of chargers with falling current-voltage characteristic, a so-called W-characteristic, whereby the admissible charging current is set and, when gassing voltage is obtained, e.g. via a D.C. measuring relay, a synchronometer or a similar timing unit is switched on, which after a pre-determined period of time, the boost charging period, switches the charger off or over. Apart from these time-dependent cut-off devices, also, those which are dependent on current, voltage, and temperature are known.

These well-known procedures are disadvantageous in so far as the cut-off voltage must be set to a mean value. Depending on the state of the battery to be charged, the required boost charge can depart from this mean value, overcharge the battery and thus reduce its service life, which is e.g. the case with warm batteries, or the battery is not fully charged and consequently its capacity not fully used.

With the method according to this invention these deficiencies are eliminated by automatically determining the shape of the charging voltage curve as a function of time when the gassing voltage of the storage cell or storage battery has been reached and switching the charging current off or over to trickle charge, when the increase of the charging voltage gets near zero in the course of time.

The invention is based on the fact that full charge of the storage cell can most surely be ascertained from the shape of the charging voltage curve as a function of time. Full charge is reached when the charging voltage, after it has exceeded the gassing voltage, no longer increases, i.e. remains constant, despite a flowing charging current.

The right moment for switching off the charging current or switching it over to trickle charge can be determined by automatically measuring the charging voltage, after the gassing voltage has been reached, in about equal intervals of e.g. 15 minutes, which are pre-determined according to the purpose in view, storing the measured values till the following measurement and subtracting the two consecutive measured values, and switching the charger off or over to trickle charge as soon as the difference between two consecutive measurements nears zero.

The method according to this invention can be simplified by automatically imitating the shape of the storage cell or the storage battery charging voltage curve as a function of time, after reaching the gassing voltage, by an auxiliary voltage by charging a capacitor with a charging current which automatically is variable within the pre-set limits, such that the auxiliary voltage is a certain extent smaller than the charging voltage as long as the difference of the charging voltage exceeds the difference quotient of the capacitor voltage defined by the pre-determined lower limit of the capacitor charging current after the same time, and by automatically cutting off the charge, if the charging voltage equals or is smaller than the capacitor voltage.

With these and other objects in view, the invention will be described in connection with a preferred embodiment in the drawings, of which:

Figure 1:
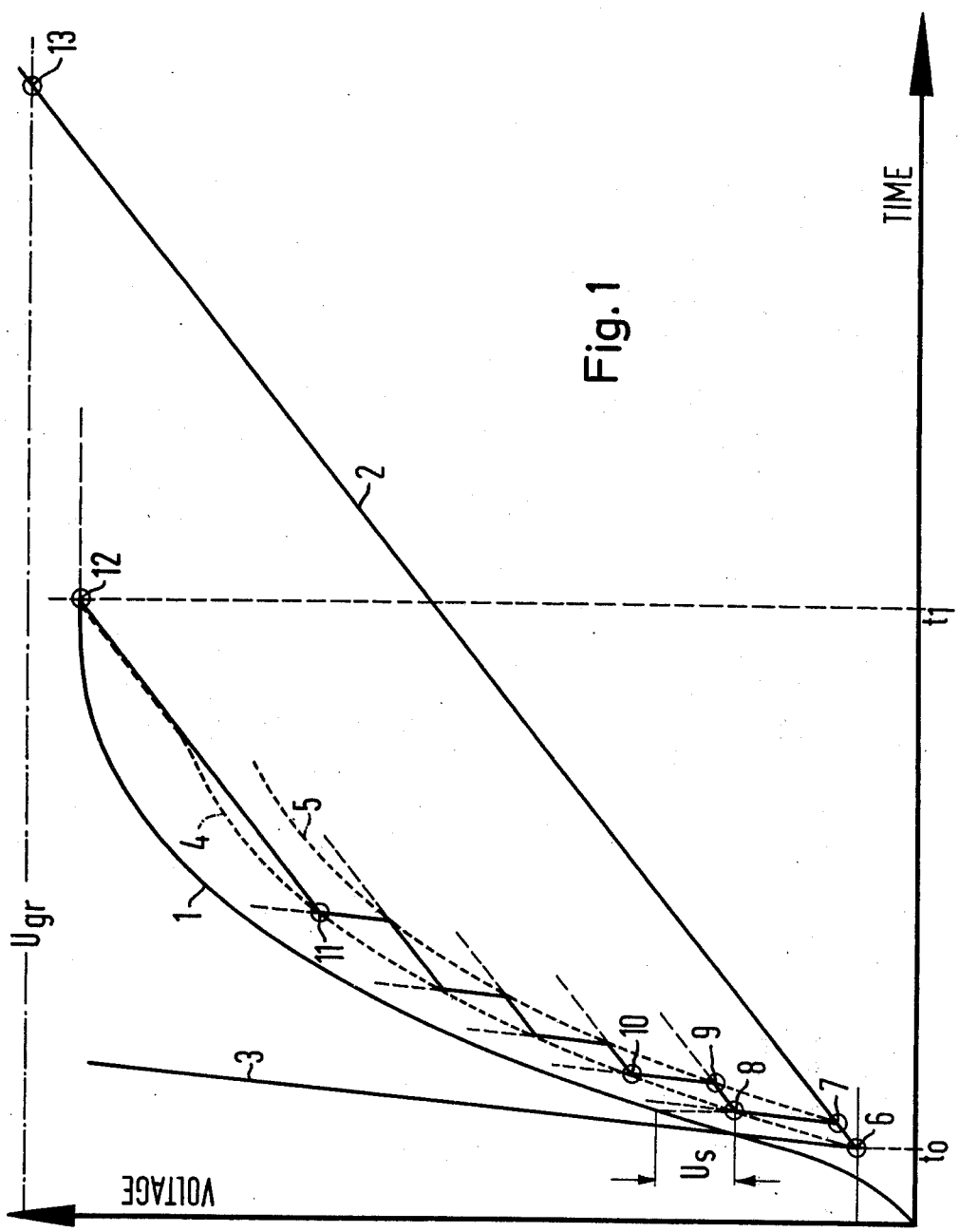
FIG. 1 shows the shape of the battery charging voltage curve — as a function of time — and the auxiliary voltage.

Curve 1 in FIG. 1 represents the charging curve of the storage battery, i.e. the shape of the charging voltage curve of a storage battery as a function of time when gassing voltage has been reached. The straight lines 2 and 3 represent the increase of the charging voltage of the capacitor at the pre-set limits of its charging current, i.e. the slope of line 2 represents the variation rate of the capacitor's charging voltage with the pre-set minimum charging current and the slope of line 3 that with the maximum charging current. Curve 4 represents the nominal curve for the auxiliary voltage $U_h$ which runs lower than the charging voltage $U_b$ of the storage battery by $\Delta U_s$, the safety distance. The curve 6 . . . 12 shows the variation of the capacitor voltage, which is approximated to the variation of curve 4 by joining together straight parts corresponding alternately to the slope of line 2 or 3, respectively.

Curve 5 runs somewhat below curve 4. In order to make the function of this invention clearer, an enlarged view is shown of the vertical spacing between these two curves. When the critical voltage $U_g$ which more or less coincides with the gassing voltage is exceeded at point 6, charging of the capacitor with the charging current $I_{min}$ starts. Its voltage runs according to curve 2 till the intersection with curve 5 at point 7. Now that the difference between $U_b$ and $U_h$ has become measurably larger than $\Delta U_s$, the capacitor charging current is automatically switched to $I_{max}$. The charging curve then runs parallel to line 3 until it reaches curve 4 at point 8.

By an automatic switching back of the charging current to $I_{min}$, falling below the safety distance $\Delta U_s$ is prevented, and the capacitor voltage increases to point 9 according to line 2. Here, the charging current is switched again to $I_{max}$; falling below the safety distance $\Delta U_s$ is prevented by again switching over the charging current, etc., to point 11. From now on the difference $U_b-U_h$ no longer increases, i.e., the slope of curve 1 equals or is smaller than the slope of line 2. The $I_{min}$ charging current is maintained till the point $t_1$ when the two curves intersect at point 12, i.e. until the auxiliary voltage has become equal to the charging voltage. At this moment the charging current is cut off or switched over to trickle charge. By properly selecting $\Delta U_s$ and $I_{min}$ it can be assured that the intersection 12 lies on the horizontal part of the storage battery's charging curve. This means that the charge is neither interrupted before full charge is reached, nor any later.

If the case should arise that due to any defect, the voltage of the capacitor reaches values which are above the possible charging voltage of the respective storage battery, it is useful to provide for a safety cut-off device automatically operating whenever the capacitor voltage reaches the critical value $U_{gr}$ which lies above the possible charging voltage, as e.g. at point 13.

Figure 2:
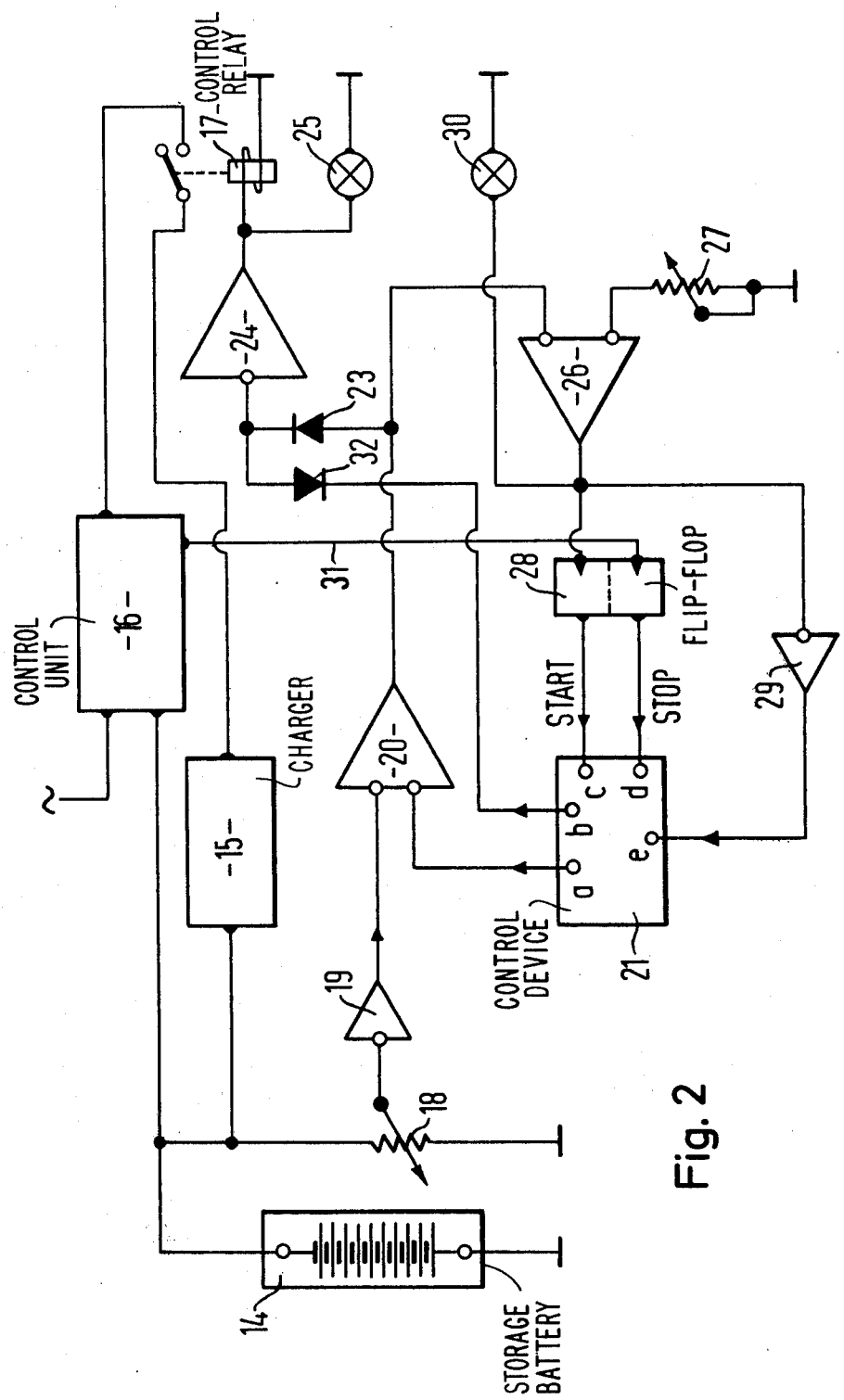
FIG. 2 shows a block diagram of equipment for performing this method.

In a design example for applying the method according to this invention — shown in FIG. 2 — the storage battery 14 is charged by the charger 15 which is fed by the power supply and mains control unit 16 via the contacts of the control relay 17.

At the voltage divider 18, a portion, e.g. the portion of the charging voltage pertaining to a single storage cell of the storage battery 14, is tapped off and fed to the input of the amplifier 19. In this amplifier those portions of the input voltage are suppressed which correspond to charging voltages lying below a definite starting voltage which approximately equals the gassing voltage. Thus, a voltage is available at the amplifier output which is proportional to the portion of the charging voltage ($U_b - U_{st}$) running above the starting voltage.

This voltage is compared with the signal supplied by the control device 21, the voltage $U_c$ of the capacitor 22 (FIG. 3), by means of the differential amplifier 20. The output voltage of the differential amplifier 20 is positive if the output voltage of the amplifier 19 exceeds the capacitor voltage $U_c$. Via diode 23, this positive voltage is fed to the amplifier 24, its output current attracting the control relay 17 via whose closed contacts, the charger 15 is switched on. The pilot lamp 25 lights up indicating that the charger 15 is switched on.

The value of the positive output voltage of the differential amplifier 20 is a measure for the difference between the charging voltage $U_b$ and its imitation. This positive output voltage is fed to the amplifier 24 and, in addition, to the switching amplifier 26 which is designed as a differential amplifier. There it is compared with the voltage adjustable by the control 27, which determines the safety distance $\Delta U_s$. If the positive output voltage of the differential amplifier 20 exceeds the voltage set at the control 27, the condition at the output of the switching amplifier 26 changes and the flip-flop 28 relays to the control device 21 the signal "START". Simultaneously, the output of the switching amplifier 26 feeds, to the control device 21, via the amplifier 29, the signal for correcting the shape of the capacitor voltage curve. At the same time the lamp 30 lights up indicating that the boost charge phase has started. If the slope of the charging curve of the storage batteries to be charged decreases such that it becomes smaller than the slope of the straight line (FIG. 1) defined by the minimum charging current $I_{min}$, the positive output voltage of the differential amplifier 20 drops to zero or below and the control relay 17 releases.

If due to a defect, the output voltage of the amplifier 19 remains positive, the control device 21 gives a signal to the amplifier 24 at its terminal b via diode 32, thus causing control relay 17 to release and the charge of the storage battery to be cut off.

If during the charging cycle the mains voltage fails, a connection 31 is provided between the flip-flop 28 and the power supply and mains control unit 16, which in turn feeds the "STOP" signal to the control device 21, by which the auxiliary voltage is switched back to the starting point. As soon as the mains voltage is available again, the auxiliary voltage starts to build up again and returns to the same point corresponding to the increase of the charging voltage of the storage battery.

Figure 3:
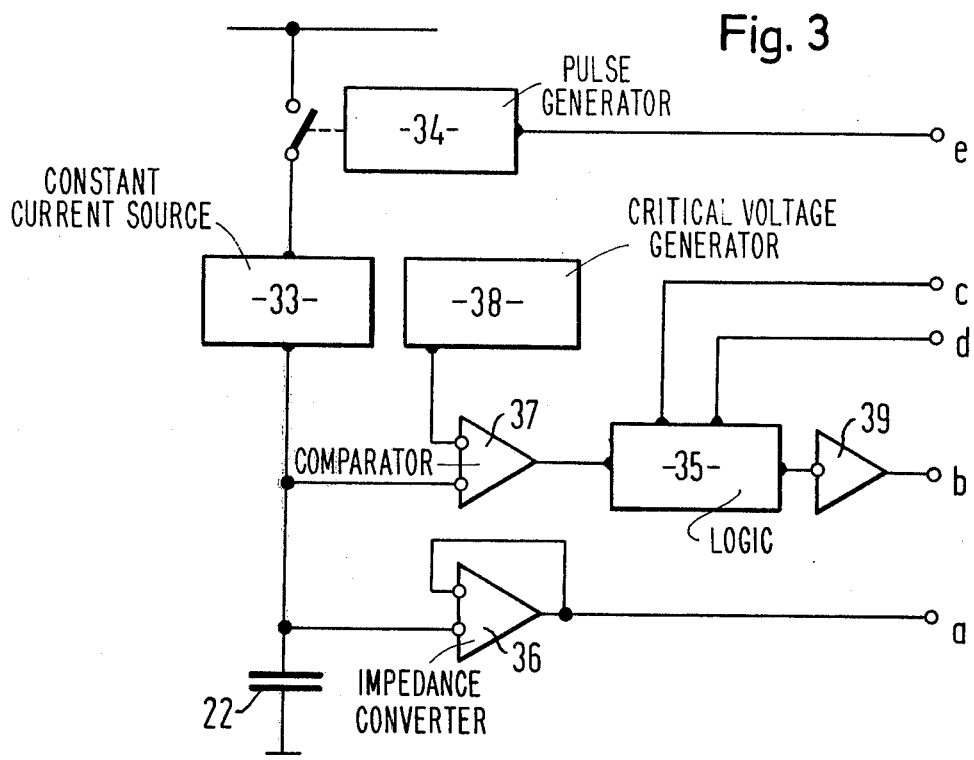
FIG. 3 shows the block diagram of the device of FIG. 2 for generating the auxiliary voltages corresponding to the respective charging voltages of the storage battery.

FIG. 3 shows details of the control device 21. The designations of the terminals a, b, c, d and e correspond to those of FIG. 2. The capacitor 22, whose voltage serves as auxiliary voltage, is charged by the pulsed current of a known constant source 33. By changing the duty cycle or the pulse frequency with a constant pulse width of the pulse generator 34, the effective charging current can be reduced much more than the constant current and therefore the capacity of the capacitor 22 can be selected much smaller than it would be necessary otherwise. In addition, in spite of using a constant current source, the effective charging current can not only be reduced to any size, but be varied and controlled within a wide range.

In the present case the pulse generator is set to such a value that the effective charging current equals the fixed minimum value $I_{min}$ as long as no signal for correcting the effective charging current is available at the terminal e. If such a signal is avialable, the duty cycle of the pulse generator is varied such that the effective charging current is equal to the pre-determined maximum charging current $I_{max}$.

The signals coming from the flip-flop 28 (FIG. 2) and available at the terminals c and/or d, are processed in the logic 35 and the build-up of the auxiliary voltage initiated or stopped. The voltage available at the capacitor 22 is fed to terminal a via the impedance converter 36. The voltage of the capacitor 22 is also available at one input of the comparator 37. At its second input, the critical voltage $U_{gr}$ generated in the unit 38 is available. The output of the comparator 37 is available at the logic 35 which generates the switch-off signal for the control relay 17 and which goes to the amplifier 39 and is fed to terminal b from its output.

Figure 4:
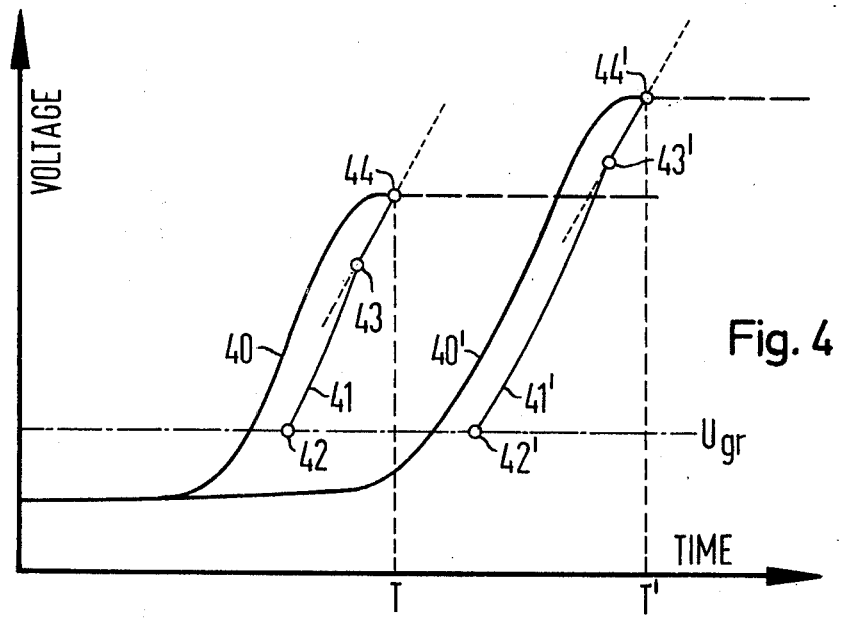
FIG. 4 shows the function of the invention on the basis of the shape of the charging curve of two different storage batteries as a function of time.

FIG. 4 shows the shape 40 and 40' of the boost charge curve of two different batteries and the respective auxiliary voltages 41 and 41'. After the voltages have reached the value $U_g$, the charging curves 40 and 40' run first about the same, and accordingly also the curves 41 and 41' of the auxiliary voltage starting at points 42 and 42'. The charging curve 40 — already after having reached a much smaller voltage — passes over to form a horizontal line at an earlier time T than the charging curve 40', where this occurs only at the time T'. Full charge, consequently, is reached after a different charging time with different charging voltages.

As the shape 41 and 41'of the auxiliary voltage curves shows, the charging current is interrupted automatically in both cases — in spite of different conditions — as soon as full charge has been reached; this results from the shape of the auxiliary voltage curves starting at point 42 and 42' and that of the corresponding charging curves 40 and 40' (having the same shape). Starting at the times when the slope of the corresponding charging curves is smaller than the fixed minimum slope of the auxiliary voltage curve 41 or 41', i.e. at the points 43 and 43' which are no longer at the same level as points 42 and 42', the curves pass over to the pre-set constant slope and intersect their corresponding charging curves at the points 44 or 44', thus cutting off the charging cycle at the moment when full charge has been reached.

Herein, storage devices are defined to constitute storage cells or storage batteries. Switching at least over to trickle charge is defined to mean either switching off or over to trickle charge.

While we have disclosed the method of our invention in connection with an embodiment for carrying out the method, it is to be understood that this embodiment is given by example only and not in a limiting sense.

We claim:

1. A method for charging storage devices constituting storage cells or storage batteries, with a charger and by automatically switching the charger off or over to trickle charge when full charge is reached, comprising the steps of automatically determining the shape of a charging voltage curve as a function of time after reaching a gassing voltage of the storage device to be charged, and switching the charging current at least over to trickle charge as soon as the increase of the charging voltage approaches zero in the course of time, the method including providing an auxiliary voltage by charging a capacitor with a charge current, automatically varying the charge current within preset limits and automatically simulating the shape of said charging voltage curve of said storage device as a function of time by means of said auxiliary voltage, after reaching the gassing voltage, such that the auxiliary voltage is a definite extent smaller than the charging voltage as long as a difference quotient of the charging voltage exceeds the difference quotient of the capacitor voltage defined by a predetermined lower limit of the charge current of the capacitor after the same time, and automatically cutting off the charger if the charging voltage at most equals the capacitor voltage.

2. The method, as set forth in claim 1, further comprising the steps of charging the capacitor from a source of constant current with a pulsed current by means of a frequency variable pulse generator, and varying the frequency of said pulsed current.

* * * * *

UNITED STATES PATENT AND TRADEMARK OFFICE
CERTIFICATE OF CORRECTION

PATENT NO. : 3 992 658
DATED : November 16, 1976
INVENTOR(S) : Leander Bechtold

It is certified that error appears in the above-identified patent and that said Letters Patent are hereby corrected as shown below:

On the title page item [75]

"Günther Kartscher, Buchheim, both", should be cancelled, and "Inventors" should be --Inventor--

Line 2 at the top of the page: "et al." should be cancelled

Signed and Sealed this

Eleventh Day of January 1977

[SEAL]

Attest:

RUTH C. MASON
*Attesting Officer*

C. MARSHALL DANN
*Commissioner of Patents and Trademarks*